United States Patent
Mittelstädt et al.

(10) Patent No.: US 8,025,727 B2
(45) Date of Patent: Sep. 27, 2011

(54) AGGLOMERATED STONE FOR USING IN SHAFT, COREX OR BLAST FURNACES, METHOD FOR PRODUCING AGGLOMERATED STONES AND USE OF FINE AND SUPERFINE IRON ORE DUST

(75) Inventors: Horst Mittelstädt, Dinslaken (DE); Stefan Wienströer, Hamm (DE); Reinhard Fusenig, Moers (DE); Ronald Erdmann, Dortmund (DE); Klaus Kesseler, Dortmung (DE); Matthias Rohmann, Duisburg (DE)

(73) Assignee: ThyssenKrupp Steel AG, Duisburg (DE)

( * ) Notice: Subject to any disclaimer, the term of this patent is extended or adjusted under 35 U.S.C. 154(b) by 798 days.

(21) Appl. No.: 11/628,352

(22) PCT Filed: May 25, 2005

(86) PCT No.: PCT/EP2005/005626
§ 371 (c)(1),
(2), (4) Date: Jan. 9, 2008

(87) PCT Pub. No.: WO2005/118892
PCT Pub. Date: Dec. 15, 2005

(65) Prior Publication Data
US 2008/0250980 A1    Oct. 16, 2008

(30) Foreign Application Priority Data
Jun. 3, 2004 (DE) .......................... 10 2004 027 193

(51) Int. Cl.
*C04B 18/02* (2006.01)

(52) U.S. Cl. .......................... 106/737; 263/333; 106/713

(58) Field of Classification Search ................... 106/737, 106/713; 264/333
See application file for complete search history.

(56) References Cited

U.S. PATENT DOCUMENTS

| | | | | |
|---|---|---|---|---|
| 916,409 A | * | 3/1909 | Begle | 106/731 |
| 1,994,378 A | * | 3/1935 | Williams et al. | 75/322 |
| 3,374,085 A | * | 3/1968 | Stone | 75/771 |
| 3,676,104 A | | 7/1972 | Kihlstedt | |
| 3,925,069 A | * | 12/1975 | Shimada et al. | 75/773 |
| 4,119,455 A | * | 10/1978 | Cass et al. | 75/310 |
| 4,168,966 A | * | 9/1979 | Furui et al. | 75/322 |
| 4,197,115 A | * | 4/1980 | Suzuki et al. | 75/770 |
| 4,846,884 A | * | 7/1989 | Shigematsu et al. | 75/771 |
| 2002/0152839 A1 | | 10/2002 | Aota et al. | |

FOREIGN PATENT DOCUMENTS
JP            53 142301 A       12/1978

* cited by examiner

*Primary Examiner* — Paul Marcantoni
(74) *Attorney, Agent, or Firm* — Proskauer Rose LLP

(57) ABSTRACT

In order to also be able to economically use iron ore dust which is created by the extraction and preparation of iron ore and has not been usable until now, the invention proposes an agglomerated stone comprising (in wt. %) 6-15% of a cement binding agent, up to 20% of a carbon carrier, up to 20% of residual and recyclable substances, optionally up to 10% of a coagulation and solidification accelerator and the remainder consisting of iron ore in a stone format in the form of particles having a particle size of less than 3 mm as well as possessing after three days an initial strength of at least 5 N/mm² and after 28 days a cold compression strength of at least 20 N/mm². As a result of the particular hardness St and form stability thereof even at high temperatures T, agglomerated stones according to the invention are especially suitable for use in shaft, corex or blast furnaces. The invention also relates to a method for producing agglomerated stones according to the invention.

16 Claims, 3 Drawing Sheets

AGGLOMERATED STONE FOR USING IN SHAFT, COREX OR BLAST FURNACES, METHOD FOR PRODUCING AGGLOMERATED STONES AND USE OF FINE AND SUPERFINE IRON ORE DUST

BACKGROUND

The invention relates to an agglomerated stone for using in shaft, corex or blast furnaces, to a method for producing such agglomerated stones as well as to the use of fine and superfine iron ore dust.

In the extraction, dressing, preparation and processing of ore, large quantities of fine and superfine iron ore dust having a particle size of up to 3 mm occur. In order to be also able to use this dust for metal production, it must be converted into a stone format. Usual methods for making stones from fine and superfine ore used in the metallurgical industry are sintering and pelletising.

In order to sinter iron ore dust, a mixture of dampened fine ore as well as coke slack or another carbon carrier and limestone, quicklime, olivine or dolomite aggregates are usually spread onto a circulating grate, the so-called "sintering belt" and fired from above. Carbon contained in this mixture incinerates with the aid of the air drawn by the sintering belt and thus causes agglomeration of the ore particles. On reaching the end of the sintering belt the layer lying on the belt is completely sintered in this way. The solidified iron ore is broken up, sieved in the still glowing state and fed to a cooler, where it is gently cooled so that its hardness is not impaired. The sinter obtained after further sieving the fine components of the cooled sinter mixture, due to high gas permeation and good reducibility, is suitable for direct charging in the blast furnace.

With the known sinter method iron ore dust can usually only be converted economically into a stone format, if its particle size is 2 mm or more. Iron ore dust having substantially smaller particle sizes can be used for metal production by pelletising.

SUMMARY OF THE INVENTION

In the pelletising process fine ore and concentrates having particle sizes far below 1 mm are formed into small balls, whose diameter with the normal process is 10-15 mm. For this purpose the iron ore dust is dampened and mixed with up to 10 wt. % of a binding agent consisting for example of blast furnace slag and cement. The so-called "green pellets" then come from this mixture in rotary barrels or on rotary tables. The resultant, still moist green pellets are dried and calcinated at temperatures of more than 1,000° C. in a shaft furnace, rotary kiln or on a travelling grate. A detailed illustration of the prior art in the technique of pelletising metal oxide containing, fine-particle iron ore dust is to be found in German Patent DE 33 07 175 A1.

With the pellets produced by pelletising a uniform particle size, compared with lump ore, constant quality and high gas permeation can be guaranteed during reduction. However, the danger exists that the pellets agglomerate during their reduction or lose their form with the consequence that the reduction cannot be carried out with the success desired. Besides the complex and costly way of their production, pellets can therefore only be used to a limited extent.

A further method of using iron oxide present in fine-particle form for pig iron production is presented in the lecture "Oxygen Cupola for recycling waste oxides from an integrated steel plant", given by Michael Peters et al on 17 Jun. 2003 at the 3rd International Conference on Science and Technology of Steel Making METEC Congress 03 in Düsseldorf, Germany; said method has also been described in the article "A new process for recycling steel plant wastes" by Christian Bartels von Varnbueler to be found under the URL "http://briket.ru/eng/related_articles.shmtl" in the Internet. With this prior art method, which is also known under the designation "OxiCup method", it is possible with major economic benefit to feed back into the smelting process as recycling material the iron oxide residues, which occur in large quantities as residual or recyclable substances in the form of filter dust during pig iron production. For this purpose the residues of iron production (iron oxide dust), present in fine to superfine form, are mixed with a carbon carrier such as coke slack, water and a cement acting as a binding agent. Blocks, which possess a hexagonal surface area, are formed from the mixture.

After drying the blocks obtained in this way on the one hand are so easy to pour and so fluid that they can be fed without problem into the OxiCup furnace used for iron production. On the other hand they are so stable and so solid that they can also withstand the loads arising in the furnace due to the column of advancing material pressing on them.

When dropping from the high level filling position towards the hot zone of the OxiCup furnace, the blocks are then heated to a temperature above 1,000° C. The carbon carrier contained in the blocks is converted in this case into CO gas, which causes a direct reduction of the iron oxide content in the blocks. The OxiCup process thus provides an economic method for recyling dust occurring during iron production.

In the extraction and processing of iron ore, large quantities of fine and superfine iron ore dust present in stone format arise in the vicinity of the deposit. The storage and disposal of this iron ore dust represent a major problem, since the high cost associated with sintering or pelletising this dust makes economic use more difficult. This leads to major problems in the disposal of fine and superfine iron ore dust at the site of ore extraction or processing.

In order to also be able to economically use the iron ore dust which has not been usable until now, the invention proposes an agglomerated stone for using in shaft, corex or blast furnaces, comprising (in wt. %) 6-15% of a cement binding agent, up to 20% of a carbon carrier, up to 20% of residual and recyclable substances, and optionally up 10% of a coagulation and solidification accelerator and the remainder consisting of iron ore in a stone format in the form of particles having a particle size of less than 3 mm as well as possessing after three days an initial strength of at least 5 N/mm and after 28 days a cold compression strength of at least 20 N/mm$^2$.

In contrast to the prior art, fine and superfine iron ore dust, which is present in a stone format, is used according to the invention. Such iron ore essentially contains no metallic iron, but only pure iron oxide, which may be contaminated with a little rocky matter. Therefore, agglomerated stones according to the invention in principle have different properties to the recycled stones produced in the prior art until now from residual and recyclable substances.

Thus, ore stones of the type according to the invention possess a substantially higher early and ultimate strength than the known recycled stones. Due to the high pressure load resistance of at least 20 N/mm$^2$ of the agglomerated stones according to the invention existing in the finished condition, they can safely withstand the pressure of the pouring column in the blast furnace.

At the same time agglomerated stones according to the invention regularly attain a minimum hot compression strength of 10 N/mm$^2$.

In this case, the composition of the inventive ore stones is coordinated in such a manner that in the blast furnace charge, if the binding properties of the cement material breakdown with increasing temperature and heating up time, the metallized iron ore forming at these temperatures as supporting structure can maintain the gas permeability of the stone as well as of the entire blast furnace contents. The particular hardness and form stability of agglomerated stones according to the invention make these stones particularly suitable for using in shaft, corex or blast furnaces.

With the agglomerated stones according to the invention it is thus possible to use cheaply available, until now not economically usable fine and superfine iron ore dust, which occurs during the extraction and processing of iron ore at the deposit, for iron production. By using cement as the binder even superfine iron ore dust can be formed into a solid block, which possesses optimum performance characteristics both for its production and for its use.

As a further positive effect of the invention, apart from the economic advantages provided by the invention, a substantial reduction in environmental impact is achieved in the vicinity of the extraction and processing sites of the ore extraction. Iron ore dust, which until now reached its way into the environment and in particular led to substantial pollution of the watercourses there, can be profitably used with the invention.

Regarding the problem of disposing of residual and recyclable substances it also counts as an advantage of the invention that agglomerated stones according to the invention can contain up to 20% of residual and recyclable substances. These substances concern conglomerates, which besides iron in metal and oxide form contain further impurities. Such residual and recyclable substances occur for example during steel-making and processing in the form of filter dust, furnace dust or mill scale.

The ultimate strength of the agglomerated stones according to the invention is so high in each case that they safely withstand the loads arising when charged in the respective furnace. Since agglomerated stones according to the invention can be substantially larger, they are suitable for using in large furnaces, such as shaft, corex, or blast furnaces and guarantee there improved gas permeability during the reduction.

At the same time the early strength of the agglomerated stones, constituted according to the invention, is sufficient for them to be transported even a short time after their production. This makes it possible, for example, to stack the agglomerated stones according to the invention soon after their formation in a drying room, where they can then be dried with particular effectiveness.

Agglomerated stones according to the invention can be manufactured using currently known block-making machines, as used for example in the production of paving stones. Such block-making machines render the possibility of particularly economic production and also contribute to the fact that the agglomerated stones according to the invention can be manufactured particularly cheaply, further increasing the economy of their use.

Expensive heat treatment, as necessary with sintering or pelletising for example, is not required to produce the stones according to the invention. Thus, for example, the calcination gases inevitable when sintering are avoided and a considerable burden on the environment is lifted.

Practical experiments have shown that agglomerated stones according to the invention render the possibility of economic use of iron ore dust over the entire range of conceivable particle sizes up to 3 mm. Thus, iron ore dust having a particle size of up to 1 mm can be processed as problem-free and used as effectively as iron ore dust having a particle size of up to 500 μm, which typically arises in the vicinity of certain deposits. Also, such iron ore dust, which occurs with a particle size in the range of 5-30 μm during the pelletisation of iron ore, so called "pellet feed" can still be used in that agglomerated stones are made from this. Investigations also show that even dust with particle sizes of up to 7 μm collected in aqueous solution, occurring during production of ore concentrates, can be profitably used for iron production, if agglomerated stones according to the invention are formed from it.

The iron ore contained in agglomerated stones according to the invention of fine particle size is preferably present in haematitic ($Fe_2O_3$), magnetitic ($Fe_3O_4$) and/or wustitic (FeO) modification, whose particle size diameter is likewise preferably less than 0.1 mm.

It is especially to be emphasized here that the invention renders the possibility of also using poorly sinterable or pelletisable ferrous materials for pig iron production. Accordingly, iron ore in the form of geothite (FeO(OH)) can be used for producing agglomerated stones according to the invention. This applies even if the geothite is present in a particle size of up to 2 mm, wherein especially particle sizes, which are substantially smaller than 2 mm, can also be used.

In order to ensure as effective use as possible during pig iron production, the content of iron in the case of an agglomerated stone according to the invention should be at least 40 wt. %.

The invention exploits the already well-known concept of cold binding the recyclable iron ore dust present in stone format without special heat treatment with the aid of a cement. Apart from the use of iron ore dust which can only be sintered or pelletised with difficulty, already mentioned, the cement binding furthermore renders the possibility of varying the slag make-up, more particularly its contents of MgO, CaO, $SiO_2$, $Al_2O_3$ during pig iron production, by means of the respective cement content in the agglomerated stone.

Portland cement or furnace cement, which is cheaply available, can be used as cement binding agent. The binding agent concerned is blended with the iron ore dust as hydraulic cement phase. Particularly good performance characteristics with optimum preservation of resources are achieved at the same time if agglomerated stones according to the invention contain 6-15 wt. % of cement binder. As a result of this limited content of cement the early strength of at least 5 $N/mm^2$ determined after 3 days and the cold compression strength of at least 20 $N/mm^2$ ascertainable after 28 days is particularly reliably achieved in each case with agglomerated stones according to the invention. Dependent on the content of their other components it can also be expedient, however, to increase the content of cement binder up to 20 wt. % or to reduce it to less than 5 wt. %.

The special behaviour of the agglomerated stones according to the invention during heating up was shown to be particularly advantageous for the charge in a furnace for pig iron production. Thus, the embedding of the iron ore dust present in stone format at temperatures of up to 400° C, in a cement binder, according to the invention, results in a rise of hardness. In the temperature range of more than 400° C, to 800° C, the hardness only degrades slowly. Due to this behaviour the agglomerated stones on their travel through the furnace maintain their form for such a period of time that they are safely transported to the hot smelt zone. Their hardness only then drops off faster at temperatures above 800° C, to 1,000° C,. The metallized iron ore forming in this temperature range during the reduction guarantees the form stability of the agglomerated stone with further heating up and maintains its gas permeability.

If this is expedient from a technical aspect for example in order to maintain particular cycle times, agglomerated stone according to the invention, apart from the cement binding agent, can also optionally contain a coagulation and solidification accelerator, such as soluble sodium silicate, aluminous cement, calcium chloride, an alkali salt, more particularly an Na salt, or a cellulose adhesive, such as paste.

The ore stones processed in dust form according to the invention can be charged both directly reducing with a reduction agent (carbon carrier) and also without reducing agents. If a reducing agent is used, the maximum content of the agglomerated stone in the carbon carrier should be no more than 20 wt. %. Optimum adaptation of the content to the percentage by weight of the iron is achieved in this case if the agglomerated stone contains 8-15 wt. % of the carbon carrier. However, if the percentage of volatile components in an agglomerated stone according to the invention is high, the otherwise degraded reduction capacity can be compensated by increased content of the carbon carrier component.

In principle, all substances with reductionable, free carbon are suitable as carbon carriers. Thus, coke dust, coke chippings, coke slag or anthracite coal are applicable. The particle size of the carbon carrier is preferably up to 2 mm. Carbon carriers with such a particle size are available particularly cheaply and can be used only with difficulty for iron production.

Agglomerated stones according to the invention should possess a cylindrical, cuboidic or multi-angular form, in order to guarantee on the one hand sufficient stability and on the other hand to ensure, after being filled in the furnace that sufficient gaps form between them for gas to permeate the charge. In particular if the agglomerated stones have a block form with a polygonal, in particular hexagonal surface area, the form-shaping surface is used to the optimum.

As "green compact", that is to say after it has been shaped in the still moist condition, the water content of the agglomerated stone according to the invention should be less than 25%. The production of slightly moist crumbly green compacts is simplified in relation to the processing of solids with higher moisture content. Moreover, by limiting the water content of the green compacts according to the invention it is not necessary to expel redundant water in the furnace with high consumption of energy.

Surprisingly it has been shown that agglomerated stones according to the invention attain a reduction ratio of at least 80% in the reduction during a standardized RuL test ("RuL"=reduction under load), in particular up to 100%, (reduction ratio [%]=($Fe_{met}/Fe_{gas}$) 100%).

Because the invention proposes the use of fine and superfine ore having a particle size of up to 3 mm present in a stone format for producing agglomerated stones, such iron ore dust, can also be employed for pig iron production, which until now could only be used with difficulty or uneconomically for this purpose.

Agglomerated stones according to the invention can be manufactured particularly simply. For this purpose, iron ore in a stone format in the form of fine or superfine iron ore dust having a maximum particle size of 3 mm is blended with binding agents present as hydraulic cement phase as well as optionally with a carbon carrier, with residual and recyclable substances and/or a coagulation and solidification accelerator, on condition that the content of the cement binding agent of the resultant mixture is (in wt. %) 6-15%, the content of the carbon carrier up to 20%, the content of residual and recyclable substances up to 20% as well as the content of coagulation and solidification accelerators up to 10%. The resultant mixture is filled into moulds. According to a first variant of the method the mixture is then compacted, before it is dried. Alternatively, however, it is also possible instead of compaction to shake the mixture filled into the mould in order to achieve an as homogeneous as possible distribution and intermixing of the individual components of the mixture. Optimum properties of the agglomerated stones can be obtained if compaction and shaking are carried out in combination or following on from one another in an appropriate way.

The invention is described in detail below on the basis of exemplary embodiments, wherein there is shown:

DETAILED DESCRIPTION OF THE DRAWINGS

In the experiments described hereunder the agglomerated stones examined were submitted in each case to the so-called "modified RuL test". In this test the melt-down behaviour of the agglomerated stones in the shaft furnace is simulated with the shaft furnace gas atmosphere under static conditions. In this way statements can be made about whether the formation of metallized iron ore as a result of reducing the iron carriers in the agglomerated stones is sufficient to counteract the breakdown of the cement binding occurring when the heating increases, without gas permeation of the shaft furnace being negatively obstructed by softening or disintegrating of the agglomerated stones. The simulation is terminated each time within the temperature range of 1,000-1,100° C.

Experiment I

In the first experiment the reduction behaviour of agglomerated stones made from superfine to fine haematitic iron ore dust, which occurred as pellet feed during pellet production was examined. The particle size of the iron ore dust in this case was between 5-30 μm.

The iron ore dust was blended with coke in the form of coke dust as carbon carrier and a fast setting, standard commercial cement as binding agent. The resultant mixture contained (in wt. %) 70 to 80% iron dust, 10 to 15% coke and 10 to 15% cement binding agent. The mixture composed in such a way is shaken in a known stone moulding machine and compacted into block-shaped agglomerated stones, which had a hexagonal surface area with a side length of approx. 30 mm and a height of 110 mm.

Figure 1:
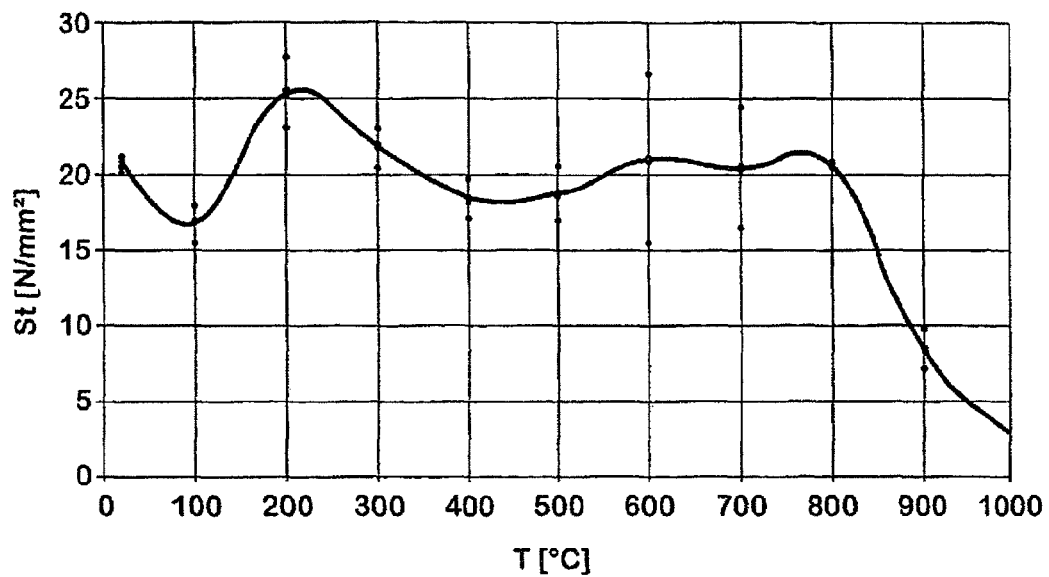
FIG. 1 the hardness of an agglomerated stone according to the invention plotted over the temperature, FIG. 2 the hardness of a conventional agglomerated stone plotted over the temperature, FIG. 3a the temperature of an agglomerated stone according to the invention plotted over the heating up time, FIG. 3b the stone height of an agglomerated stone according to the invention plotted over the heating up time, FIG. 3c the decrease in weight of an agglomerated stone according to the invention plotted over the heating up time.

After drying, the agglomerated stones were submitted to the RuL test. In this case the result was a 95.2% reduction ratio ("metallization") of the superfine haematitic iron ore dust used and a decarburisation degree of 82.7% (decarburisation degree [%]=((total carbon content before start of the test−total carbon content after end of the test)/total carbon content before start of the test) 100%). The coke present in lumps was consumed. Traces of fine coke were still to be recognized in the centre of the agglomerated stones examined. In FIG. 1 for the agglomerated stones according to the invention examined in experiment I the gradient of the hardness St in N/mm² is plotted over the temperature T indicated in [° C.,]. It is shown that the stones according to the invention already possess an early and ultimate cold strength of more than 20 N/mm² at ambient temperature. Up to approx. 300° C., the hardness of the agglomerated stones rises, and afterwards remains, up to a temperature of 850° C., level in the range of 20 N/mm. Only starting from 850° C., does the hardness then degrade, however at 1,000° C., it still lies above 3 N/mm².

Figure 2:
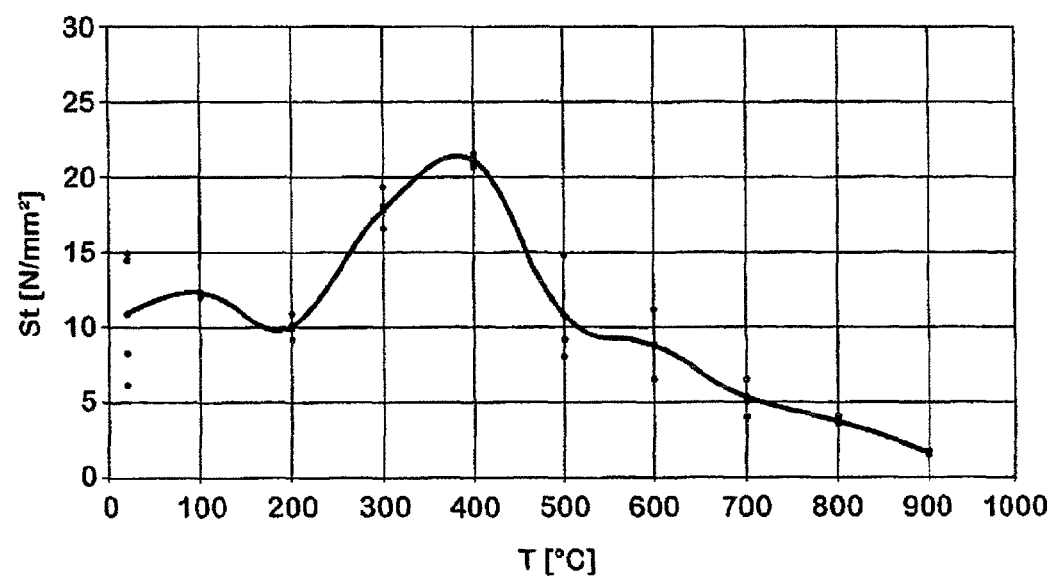

For comparison in FIG. 2 with agglomerated stones produced in a conventional way using recycled substances, the gradient of the hardness St in N/mm² is likewise plotted over temperature T indicated in ° C. It can be clearly recognized that the early and ultimate cold strengths at ambient temperature are only at the level of 12 N/mm² and at 210° C. remain at this level. Only with further rising temperature in the range up to approx. 400° C, is there a short-term rise of the hardness St to approx. 22 N/mm². Subsequently, however, the hardness St again reduces so strongly that at 900° C., it only reaches 2 N/mm².

Figure 3A:
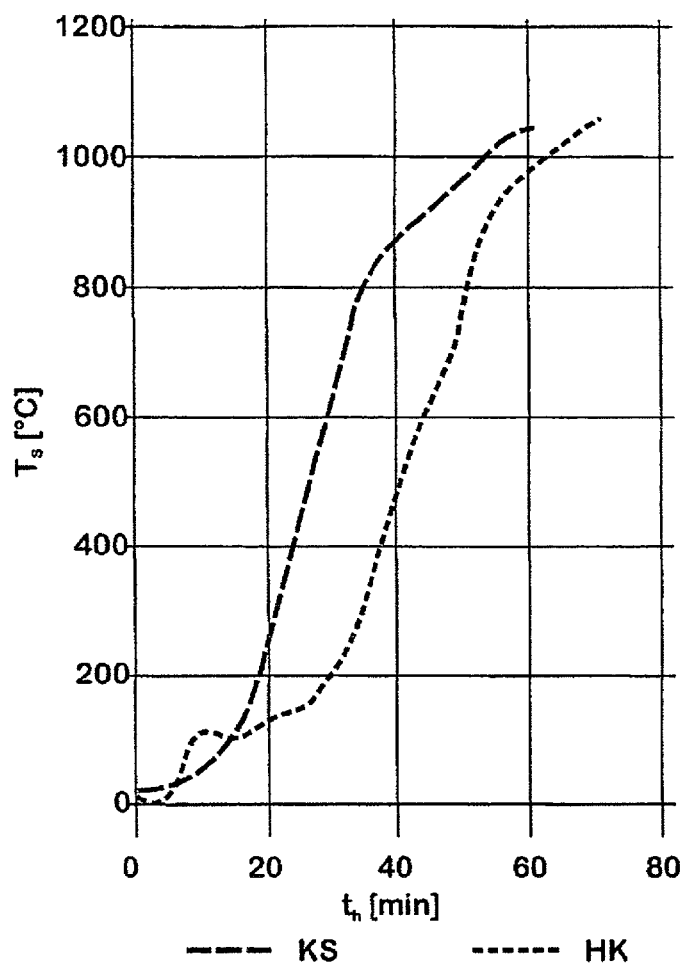

In FIG. 3a through the line "KS" the temperature gradient in ° C., of an agglomerated stone KS, with the composition used for experiment I, is plotted over the heating up time $t_h$, indicated in minutes. Additionally through the line "HK" for an agglomerated stone HK, wherein as carbon carrier charcoal has been used instead of coke dust, which, however, for the rest agrees with the agglomerated stones examined in experiment I, the stone temperature is plotted over the heating up time. Only small deviations in both gradients are shown.

Figure 3B:
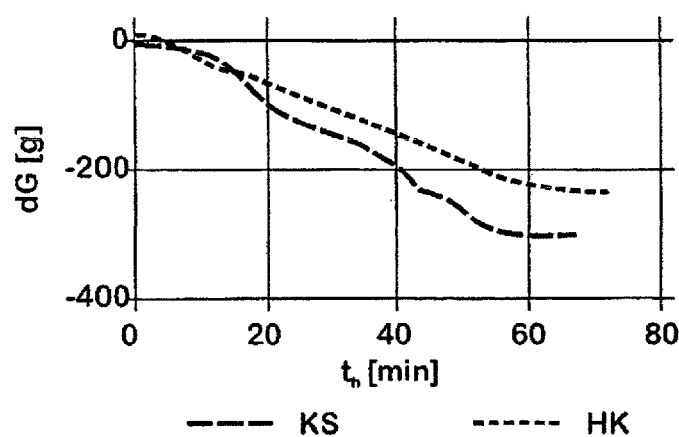

In FIG. 3b the decrease in weight dG, indicated in g, occurring with increasing heating up time $t_h$, of the agglomerated stones (line "KS") produced using coal dust, examined in experiment I and of the agglomerated stones (line "HK") produced using charcoal as carbon carrier, for the rest however agreeing with those in experiment I are again plotted over the heating up time $t_h$. Only small deviations in both gradients also are shown here.

Figure 3C:
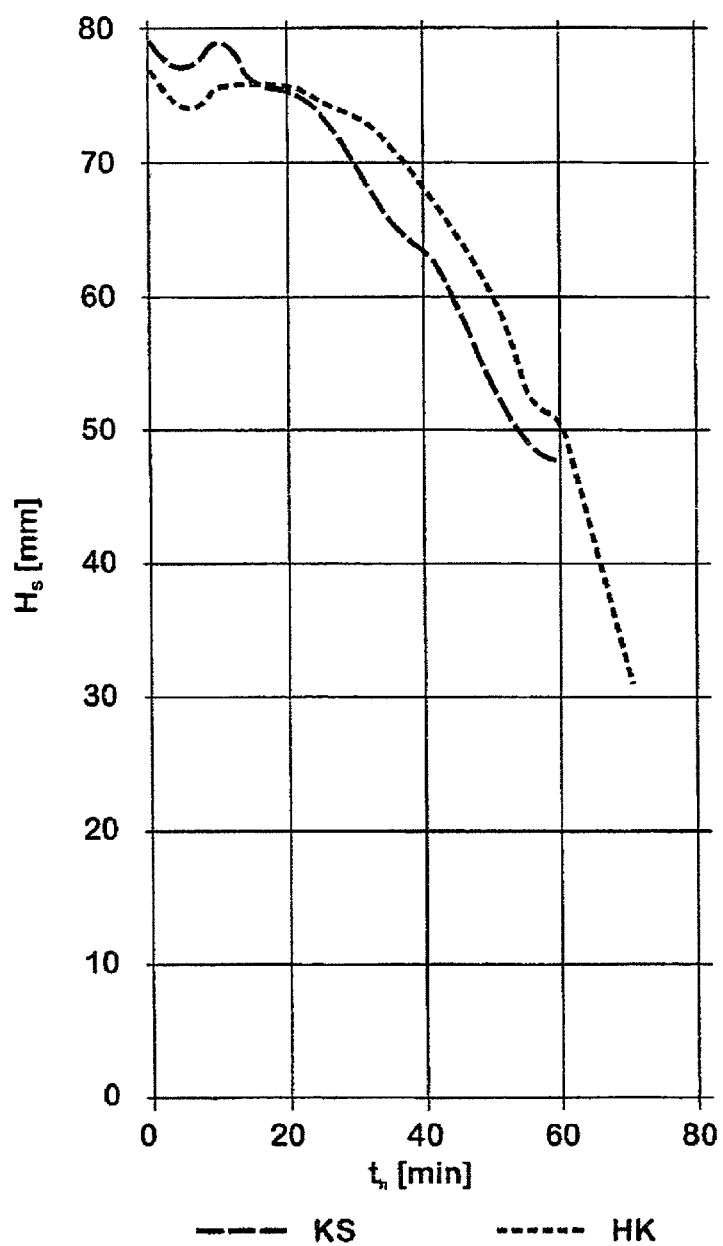

Finally in FIG. 3c the reduction in the height $H_s$ of the agglomerated stones (line "KS"), examined in experiment I, occurring with increasing heating up time $t_h$, and produced using charcoal as carbon carrier, for the rest however agreeing with the agglomerated stones (line "HK") in experiment I, are likewise plotted over the heating up time $t_h$. Again, only small deviations in both gradients are evident.

FIGS. 3a-3c as a result of the observed change in the rise of the stone temperature $T_s$, the height $H_s$ and the decrease in weight dG of the agglomerated stones KS and HK, prove that initial metallization already starts at temperatures above 800° C. This method can be observed independently with both carbon carrier materials (coke dust, charcoal). The supporting structure, forming as a consequence of the metallization, counteracts the breakdown in hardness occurring at high temperatures, so that up to the zone of a blast furnace, where the solid material on its travel downwards becomes plastic due to the ever increasing temperatures ("cohesive zone"), a hardness of the agglomerated stones sufficient for gas permeation and continued travel is ensured.

Experiment II

In the second experiment firstly iron ore dust from a concentrate, which originated from the deposit at Carol Lake, Canada, having a particle size of up to 500 μm and a haematite/magnetite ratio of 1:1 was mixed with coke dust as carbon carrier and a fast setting, standard commercial cement as binding agent. The resultant mixture contained (in wt. %) 70 to 80% iron ore-dust, 10 to 15% coke dust and 10 to 15% cement. Agglomerated stones were produced in the way already described with regard to experiment I from the mixture composed in such a way.

The agglomerated stones obtained in this were also submitted to the modified RuL test. A reduction ratio of 95.6% and a decarburisation degree of 85% resulted. The trivalent iron phase was completely reduced.

For comparison iron ore dust mainly consisting of magnetite and having a particle size of up to 1 mm made from a concentrate, which originated from the deposit at Guelbs/Kedia, Mauritania was also mixed with coke dust and a fast setting, standard commercial cement binding agent. Also in this case the iron ore content of the resultant mixture was 75 wt. %, its coke content 13 wt. % and its cement content 12 wt. %.

The agglomerated stones produced from this mixture likewise in the way already described in connection with experiment I were also submitted to the RuL test. This resulted in a reduction ratio of 88.3% and a decarburisation degree of 83.2%.

In further experiments it could be proven that even such agglomerated stones composed according to the invention, which were produced using iron ore dust having particle sizes of up to 7 μm, collected in an aqueous solution, occurring during the production of ore concentrates, reliably attain metallization degrees of 80% in the RuL test at 1,100° C,.

The invention claimed is:

1. An agglomerated stone for using in shaft, corex or blast furnaces comprising in wt. % 6-15% of a cement binding agent consisting of Portland cement or furnace cement, up to 20% of a carbon carrier, up to 20% of residual and recyclable substances, optionally up to 10% of a coagulation and solidification accelerator and the remainder consisting of iron ore in the form of particles having a particle size of less than 3 mm as well as possessing after three days an initial strength of at least 5 N/mm² and after 28 days a cold compression strength of at least 20 N/mm².

2. The agglomerated stone according to claim 1, wherein the iron ore is present in the form of fine or superfine iron ore dust.

3. The agglomerated stone according to claim 1, wherein the particle size of the iron ore is up to 1 mm.

4. The agglomerated stone according to claim 1, wherein the iron ore is present in haematitic ($Fe_2O_3$), magnetitic ($Fe_3O_4$) and/or wustitic (FeO) modification.

5. The agglomerated stone according to claim 1, wherein the iron ore is present in the form of geothite (FeO(OH)) having a particle size of up to 2 mm.

6. The agglomerated stone according to claim 1, wherein its content of iron is at least 40 wt. %.

7. The agglomerated according to claim 1, wherein the coagulation and solidification accelerator is soluble sodium silicate, aluminous cement, calcium chloride, an alkali salt, or a cellulose adhesive.

8. The agglomerated stone according to claim 1, wherein its content of carbon carriers is 8-15 wt. %.

9. The agglomerated stone according to claim 1, wherein the carbon carrier is present in the form of coke dust, coke chippings, coke slag or anthracite coal.

10. The agglomerated stone according to claim 1, wherein the particle size of the carbon carrier is up to 2 mm.

11. The agglomerated stone according to claim 1, wherein it has a cylindrical, cuboidic or multi-angular form.

12. The agglomerated stone according to claim 1, wherein during the reduction it attains a reduction ratio of at least 80%.

13. A method for producing agglomerated stones, constituted according to claim 1 wherein iron ore in the form of fine or superfine iron ore dust, having a maximum particle size of 3 mm is mixed with a Portland cement or furnace cement binding agent present as hydraulic cement phase as well as optionally with a carbon carrier, with residual and recyclable substances and/or a coagulation and solidification accelerator, on condition that the content of the Portland or furnace cement binding agent in the resultant mixture is in wt. % 6-15%, the content of the carbon carrier 8-20%, the content of residual and recyclable substances up to 20% as well as the content of coagulation and solidification accelerator up to 10%, the resultant mixture is filled into moulds, the mixture filled into moulds is compacted, and the compacted mixture is dried.

14. The method according to claim 13, wherein the mixture is subjected to a shaking movement during compaction.

15. The method for producing agglomerated stones, constituted according to claim 1 wherein iron ore in the form of fine or superfine iron ore dust, having a maximum particle size of 3 mm is mixed with a Portland cement or furnace cement binding agent present as hydraulic cement phase as well as optionally with a carbon carrier, with residual and recyclable substances and/or a coagulation and solidification accelerator on condition that the content of the Portland cement or furnace cement binding agent in the resultant mixture is in wt. % 6-15%, the content of the carbon carrier 8-20%, the content of residual and recyclable substances up to 20% as well as the content of coagulation and solidification accelerator up to 10%, the resultant mixture is filled into moulds, the mixture filled into moulds is subjected to a shaking movement, and the shaken mixture is dried.

16. The method according to claim 15, wherein the mixture, while it is subjected to the shaking movement, is additionally compacted.

* * * * *